United States Patent
Bracken, Jr.

[11] 3,965,699
[45] June 29, 1976

[54] SPRING COMPENSATED RADIALLY FLEXIBLE POWER TAKEOFF SHAFT

[75] Inventor: Joseph W. Bracken, Jr., Redford Township, Mich.

[73] Assignee: Eaton Corporation, Cleveland, Ohio

[22] Filed: Oct. 29, 1974

[21] Appl. No.: 518,678

[52] U.S. Cl. .................................. 64/1 V; 64/6; 60/39.36; 74/409; 74/10.85; 417/409; 308/184 R
[51] Int. Cl.² .................................. F16C 1/00
[58] Field of Search .............. 60/39.36; 417/409 X; 308/184; 74/409, 10.85; 64/6, 1 R, 1 V

[56] References Cited
UNITED STATES PATENTS

| | | | |
|---|---|---|---|
| 2,348,391 | 5/1944 | Kester | 74/10.85 |
| 2,348,392 | 5/1944 | Kester | 74/10.85 |
| 2,922,278 | 1/1960 | Szydlowski | 60/39.36 |
| 3,416,723 | 12/1968 | Schmitz et al. | 417/409 X |
| 3,463,030 | 8/1969 | Nuccel | 74/409 |
| 3,595,100 | 7/1971 | Stark et al. | 74/409 |
| 3,690,194 | 9/1972 | Edwards | 74/409 |

Primary Examiner—Samuel Scott
Assistant Examiner—Randall Heald
Attorney, Agent, or Firm—Teagno & Toddy

[57] ABSTRACT

A single shaft gas turbine engine of the type having a shaft assembly including, in axial alignment, a radial turbine element, a central slinger ring element, a radial compressor element, and a geared power takeoff element. The elements of the shaft assembly are interconnected by a tie bolt. An annular combustor liner defines a combustion chamber that encircles the central slinger ring. The shaft assembly is journaled by two bearings which are respectively located outboard of the turbine and on the geared power takeoff element. Each bearing is carried by a tubular support. Each tubular support has a free end carrying the respective bearing and another end secured to the bearing. The ends are spaced and interconnected by circumferentially spaced ribs to provide a flexible support for the prospective bearing. The gear on the power takeoff element drives a larger gear to withdraw power from the engine. A coil spring has one end seated on the housing and another end in contact with the free end of the tubular support carrying the bearing on the geared power takeoff element. The coil spring urges the geared power takeoff element in a radial direction that is opposite to the direction of the operational force exerted by the larger gear on the power takeoff gear. The coil spring is preloaded to exert a force equal to one half of the maximum force exertable by the larger gear on the power takeoff gear and has a spring rate that is relatively small when compared to the spring rate of the tubular support.

14 Claims, 3 Drawing Figures

SPRING COMPENSATED RADIALLY FLEXIBLE POWER TAKEOFF SHAFT

BACKGROUND OF THE DISCLOSURE

This invention relates to a rotary, radially flexible, self-aligning journal for a power takeoff shaft and finds particular utility in conjunction with a geared power takeoff shaft of a gas turbine engine.

Antipollution laws have created grave problems with respect to the continued use of internal combustion reciprocating engines. An alternative to reciprocating engines is the inherently low polluting gas turbine engine. A major drawback, however, to the large usage of gas turbine engines is their high cost relative to comparable size reciprocating engines. If such costs could be significantly reduced, gas turbine engines could replace reciprocating engines in many areas.

The assignee of the present application has disclosed a low cost, single shaft, gas turbine engine in U.S. patent application Ser. No. 214,703. One of the outstanding cost-reducing features of that gas turbine engine is the use of powdered metal gears as part of the engine's transmission. Such gears reduce the cost of the transmission to a fraction of that heretofore found in transmissions employing precision machined gears. Utilization of powdered metal gears in the transmission in the initial speed reduction (from approximately 100,000 rpm to approximately 13,500 rpm) is believed to be facilitated by the provision of a radially flexible journal for the power takeoff shaft adjacent the driving gear. The radially flexible journal permits omnidirectional movement of the power takeoff shaft, and accordingly the driving gear, thereby permitting the driving and driven gears to move radially relative to one another in response to variations in tooth form and gear eccentricity. It is believed that the relative gear movement improves gear life by lessening the dynamic and peak tooth loads and accordingly allows the use of a lower class of gear to transfer power from the turbine rotor. Further, in the disclosed gas turbine engine, the radially flexible journal can be tuned to dampen shaft vibrations and thereby remove critical shaft vibrations from the operating range of the engine. However, in some operational environments, the disclosed radially flexible journal has been observed to allow excessive power takeoff shaft centerline excursion, resulting in a reduction in shaft dampening, undesirable vibrational inputs to the shaft, and compressor and/or turbine blade rubbing.

It is accordingly an object of the present invention to provide a radially flexible, low excursion journal for a gas turbine power takeoff shaft subjected to a unidirectional radial force.

It is a further object of the present invention to provide an improved, low cost transmission having a relatively low class driven gear in meshing engagement with a relatively high speed, low class driving gear that will rotate with minimal centerline excursion.

SUMMARY OF THE INVENTION

The invention relates to a transmission of the type including a housing, a rotatable driving member, and a driven member mounted for rotation within the housing and driven by the driving member.

According to a feature of the invention, the driving member is flexibly supported to yieldably resist omnidirectional radial excursions and is supplementarily biased in a direction opposite to the direction of the operational force exerted by the driven member on the driving member. This feature allows the driving member to yieldably absorb random omnidirectional impacts imparted to it and thereafter be returned to its normal axis of rotation while simultaneously being biased in a given direction to offset a portion of a known unidirectional force exerted on the driving member by the driven member.

According to another feature of the invention the supplemental biasing means exerts one half of the maximum radial force exertable by the driven member on the driving member. This feature assures that the minimal amount of unidirectional excursion caused by the force exerted by the driven member will occur from the neutral center of rotation of the driving member during the full operational cycle of the transmission, i.e., between no load and the maximum load imparted by the driven member on the driving member.

According to a further feature of the invention the flexible support for the driving member has a relatively high spring rate and the supplemental biasing means has a relatively low spring rate. By maintaining a relatively low spring rate on the supplemental biasing means, the supplemental biasing means has only a minute effect upon the intended operation of the flexible support and therefore does not materially change the uniform omnidirectional resisting action of the flexible support.

In the disclosed embodiment, the driving member is a gear mounted on a power takeoff shaft, the driven member is a gear in meshing engagement with the driving gear, the flexible support is a ribbed, tubular, cantilevered member supporting, at its free end, a bearing journaled on the power takeoff shaft, and the supplemental biasing means is a preloaded coil spring having one end acting on the free end of the ribbed tubular member and urging it in a direction opposing the line of action of the meshing gears. The coil spring is preloaded to one half of the maximum force exerted along the line of action and has a spring rate that is about one-fiftieth of that of the ribbed tubular member.

DETAILED DESCRIPTION OF THE DRAWINGS

Figure 1:
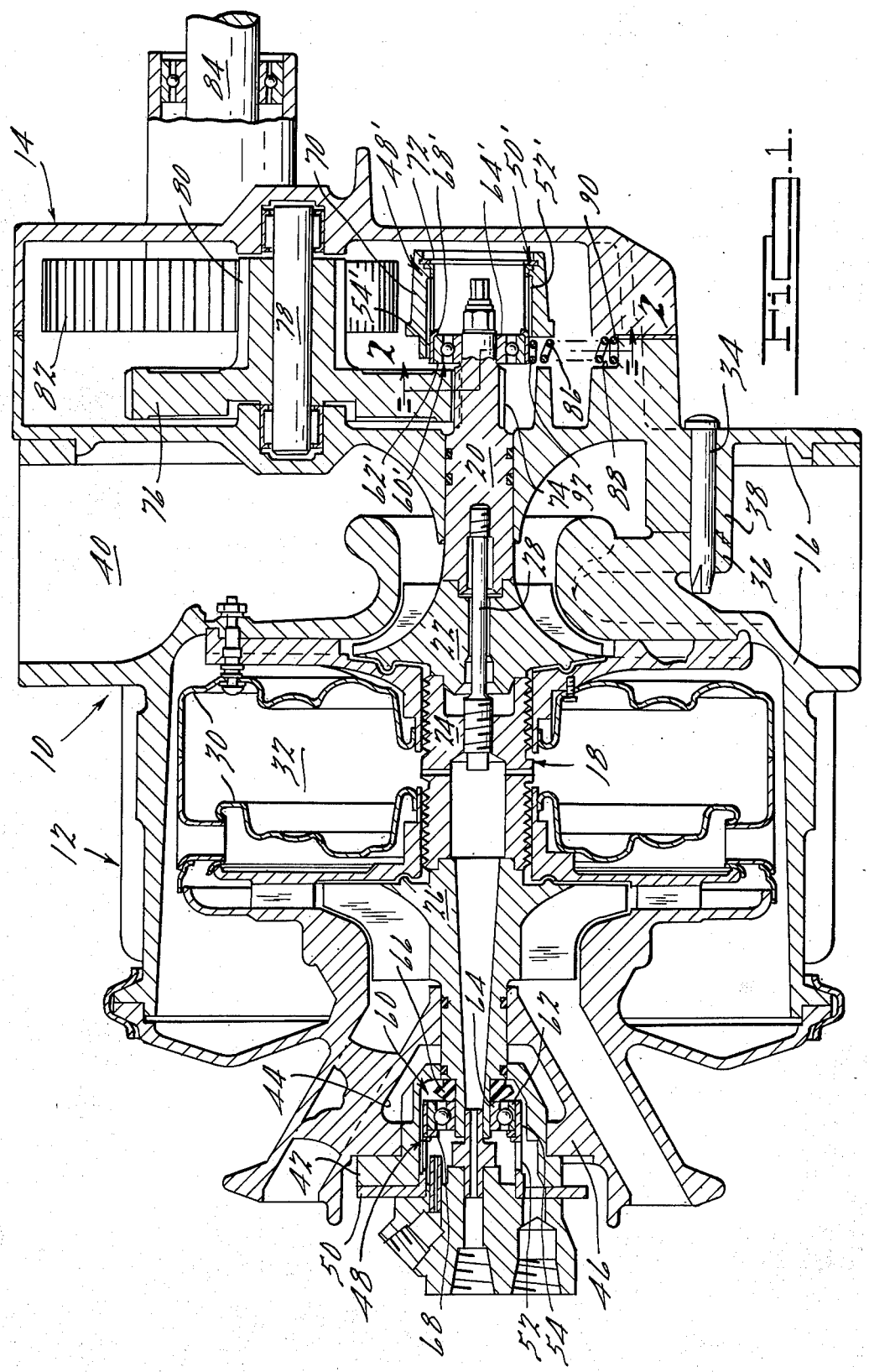
FIG. 1 is a sectional, fragmentary, side elevational view of one half of a gas turbine engine embodying features of the invention.

FIG. 1 illustrates a gas turbine engine 10 comprising a generally circular power section 12 and a speed reducing transmission 14 which are enclosed by a multi-section housing 16. A unitary, rigid shaft assembly 18 is journaled within housing 16 and comprises four axially aligned elements, namely, power takeoff shaft 20, radial outflow compressor 22, slinger ring 24, and radial inflow turbine 26. Slinger ring 24 and turbine 26 have adjacent ends of complementary stepped configuration joined together by welding. Adjacent ends of slinger ring 24 and compressor 22, and adjacent ends of power takeoff shaft 20 and compressor 22 are also of complementarily stepped configuration. A tie bolt 28, axially located relative to the four shaft elements, has opposite ends respectively in threaded engagement with power takeoff shaft 20 and slinger ring 24. The four shaft elements are brought together by tightening tie bolt 28 to form shaft assembly 18. A multipiece combustor liner 30 defines an annular combustion chamber 32 that is disposed between turbine 26 and compressor 22 and encircles slinger ring 24. Power section 12 and transmission 14 are rigidly held together by a plurality of bolts 34 (only one shown) projecting through a plurality of circumferentially spaced complementary lugs 36 and 38 integral with and space opposite annular, radially extending portions of housing 16 to form an annular air inlet 40 to compressor 22.

Figure 3:
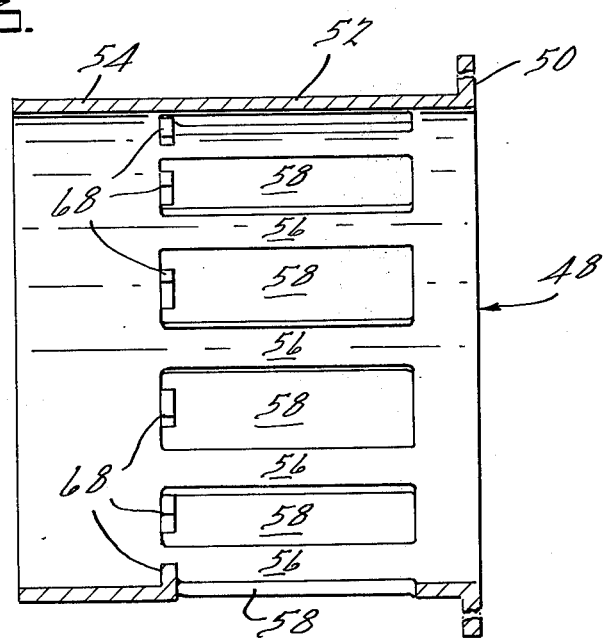
FIG. 3 is an exploded, sectional view of one half of the radially flexible bearing support illustrated in FIG. 1.

An annular rear bearing housing 42 is seated concentrically within a cavity 44 defined within the exhaust end of housing 16. Rear bearing housing 42 is supported by a plurality of circumferentially spaced ribs 46 of housing 16. Seated concentrically within bearing housing 42 is an annular birdcage bearing support 48 (illustrated in greater detail in FIG. 3) having a fixed, annular radial extending end 50 secured to housing 16 via bearing housing 42 by known fasteners (not shown), and a generally tubular shaped central portion 52 extending axially in cantilever fashion from fixed end 50 and connected to free end 54. Central portion 52 includes a plurality of circumferentially spaced resiliently deformable ribs 56 separated by a plurality of circumferentially spaced openings 58 (FIG. 3).

An antifriction rolling contact bearing 60 includes an outer race 62 supported by a free end 54 and an inner race 64 journaling a portion of turbine 26. A bearing retainer 66 is interposed between one end of inner race 64 and an annular shoulder on turbine 26. One end of outer race 62 seats against a plurality of circumferentially spaced projections 68 on bearing support 58 adjacent openings 58 and intermediate ribs 56.

The other end of shaft assembly 18 is rotatably mounted at power takeoff shaft 20 by an antifriction rolling contact bearing 60' supported at the free end 54' of an annular birdcage bearing support 48' that is similar in construction to birdcage bearing support 48. For ease of understanding and simplicity, portions of bearing support 48' and bearing 60' which are respectively similar to bearing support 48 and bearing 60 are indicated by like numeral followed by a prime symbol. Central portion 52' of bearing support 48' is spaced from an annular encircling portion 70 of housing 16. Fixed end 50' is retained in a butting engagement with portion 70 by a known snap ring 72 located in a groove while free end 54' supports outer race 62' of bearing 60'. Inner race 64' of bearing 60' journals power takeoff shaft 20 and has one end in contact with an annular shoulder on power takeoff shaft 20.

Bearing supports 48 and 48', via projections 68 and 68' and the annular shoulders on shaft assembly 18, prevent axial movement of shaft assembly 18 in housing 16. Further, by properly selecting the size of ribs 56 and 56' and the material of bearing supports 48 and 48' the critical vibration frequencies of shaft assembly 18 can be removed from the operating range of engine 10. Further details of engine 10 may be found in U.S. patent application Ser. No. 214,703 assigned to the assignee of the present application.

Figure 2:
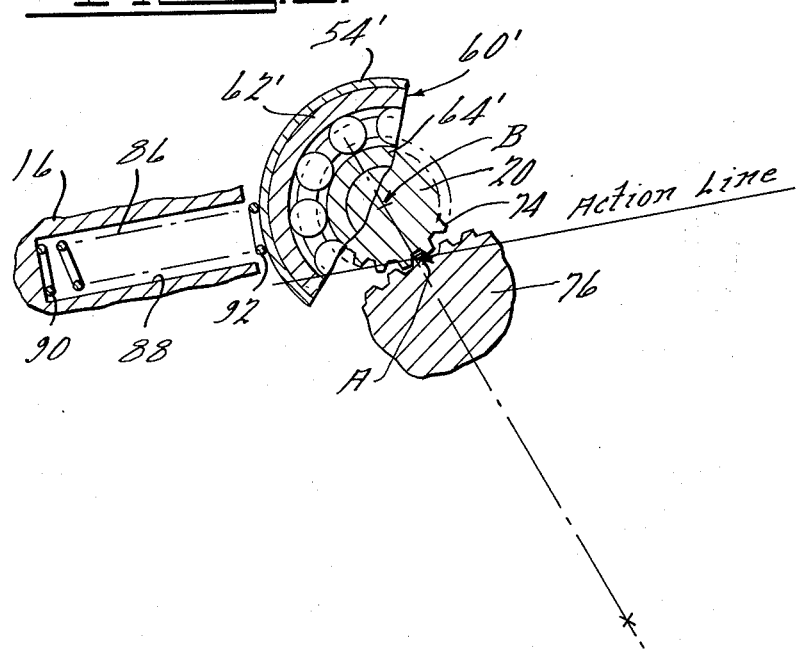
FIG. 2 is an exploded, sectional view taken on line 2—2 of FIG. 1 illustrating a fragment of the turbine engine transmission.

As illustrated in FIGS. 1 and 2, shaft assembly 18 includes a driving gear 74 which may be integral with or pressed onto power takeoff shaft 20. A driven gear 76 is mounted on a power receiving shaft 78 which is journaled at its ends for rotational movement within housing 16. Driven gear 76 is in meshing engagement with driving gear 74 and is integral with another driving gear 80 which in turn is in meshing engagement with another driven gear 82 that is secured to an output shaft 84 of engine 10. Output shaft 84 is journaled within housing 16 for rotational movement.

A preloaded coil spring 86 of known design is located in a cavity 88 within housing 16. One end 90 of coil spring 86 seats on housing 16 while the other end 92 seats on free end 54' of bearing support 48'.

During operation of engine 10 power is removed through output shaft 84 via driven gear 82, driving gear 80, driven gear 76, driving gear 74 and power takeoff shaft 20. Further, driven gear 76 exerts a force on driving gear 74 along the action line of the meshing gears 74 and 76 as illustrated by arrow A in FIG. 2. It is intended that spring 86, or any similar biasing means, will impose a unidirectional radial force on power takeoff shaft 20 that opposes the unidirectional radial force exerted by driven gear 76 on driving gear 74 and acts in a direction that is both parallel to action line A and passes through the center of driving gear 74. Unnecessary secondary moments on driving gear 74 are eliminated by directing the imposed coil spring force through the center of driving gear 74.

In the illustrated embodiment, power section 12 of engine 10 produces 18 useable horsepower which is transferable to output shaft 84. Driving gear 74 has 16 teeth while driven gear 76 has 118 teeth. During the withdrawal of the 18 horsepower, a force of approximately forty pounds is exerted along the action line by driven gear 76 on driving gear 74. The central portion 52' and the free end 54' of bearing support 48' is spaced approximately six thousandths of an inch away from annular encircling portion 70 of housing 16. The spring rate of bearing support 48' is approximately 10,000 pounds per inch. The spring rate of coil spring 86 is approximately 200 pounds per inch and coil spring 86 is preloaded to 20 pounds—one half of the maximum unidirectional force that is exertable by the driven gear 76 on the driving gear 74.

The purpose of preloading coil spring 86 to one half of the maximum exertable force on power takeoff shaft 20 is to ensure that the minimum amount of center excursion takes place away from the neutral center (indicated by point B in FIG. 2) of power takeoff shaft 20. The neutral center is defined as the place where power takeoff shaft 20 is located when shaft assembly 18 is not rotating and when coil spring 86 is not present. In the absence of coil spring 86 in the disclosed embodiment, the forty pound force exerted by driven gear 76, at maximum engine power, would deflect the center of power takeoff shaft 20 four thousandths of an inch off of the neutral center. The twenty pound preload force exerted by coil spring 86 compensates for the first twenty pounds of force thus permitting the center of power takeoff shaft 20 to move only two thousandths of an inch away from the neutral center at maximum engine power. When shaft assembly 18 is stationary, the center of power takeoff shaft 20 is offset two thousandths of an inch off of the neutral center by coil spring 84 in a direction parallel to and opposing arrow A in FIG. 2. It can readily be seen from the preceding that, in the disclosed embodiment, the maximum excursion from the neutral center caused by gear loading with coil spring 86 will only vary from two thousandths of an inch from one side of the neutral center to two thousandths of an inch to the opposite side of the neutral center. Applicant has ensured that the minimum amount of excursion from the neutral center will occur during engine operation by preloading coil spring 86 to one half of the maximum force exertable by driven gear 74.

It is further desirable to maintain the spring rate of coil spring 86 as low as possible relative to the spring rate of bearing support 48'. The reason for this requirement is to ensure that coil spring 86 has a minimal effect upon the spring rate of bearing support 48' and, accordingly, the dampening effect created by bearing support 48' on shaft assembly 18. Further, it is desirable to have as even a circumferential distribution as possible over bearing support 48' for omnidirectional resistance of randomly imposed forces.

Although the given flexible bearing support 48' and coil spring 86 are illustrated in combination with the transmission of a gas turbine engine it should be appreciated that they may be used in other environments where it is desirable to employ a radially flexible bearing support while simultaneously controlling shaft center excursion. The illustrated embodiment has only been presented since the disclosed arrangement has found particular utility in a gas turbine engine which is used in combination with a transmission having powdered metal gears. The radially flexible support 48' allows for ideal mating engagement of the driving and driven gears while the biasing means, in the form of coil spring 86, has reduced shaft center excursion to a minimum to ensure proper rotation of shaft assembly 20. It should further be appreciated that although the biasing means is illustrated in the form of coil spring 86, other resilient, force transmitting devices may be used. Similarly, radially flexible supports for journalling a rotating shaft, other than the disclosed birdcage bearing support, are also contemplated. Although the power takeoff means has been illustrated in the form of a pair of gears 74 and 76 in meshing engagement it is contemplated that the disclosed invention may find utility with friction drives, pulleys and belts, chains and sprocket and other power transferring mechanisms which impose a unidirectional load on a shaft.

What is claimed is:
1. In a transmission including a housing, a rotatable driving member, and a driven member mounted for rotation within the housing and rotatably engaged with the driving member; the improvement comprising:
   A. flexible support means operative to yieldably resist omnidirectional radial excursions of the driving member; and
   B. biasing means imposing a force on the driving member supplemental to the resisting force exerted by the flexible support means and acting in a direction parallel to the line of action of the rotative reactive forces of the driving and driven members and opposite to the direction of the rotative operative force exerted by the driven member on the driving member.

2. The improvement according to claim 1 wherein the force exerted by the biasing means is generally equivalent to one half of the maximum force exertable by the driven member.

3. The improvement according to claim 1 wherein:
   C. the flexibly support means has a relatively high spring rate; and
   D. the biasing means has a relatively low spring rate.

4. The improvement according to claim 1 wherein:
   C. the flexible support means comprises
      1. a bearing supporting the driving member for rotation, and
      2. a generally tubular shaped member having a fixed end secured to the housing, a free end supporting the bearing, and a central portion interconnecting the ends and including a plurality of circumferentially spaced resiliently deformable ribs; and
   D. the biasing means includes a preloaded resilient member supported by the housing and acting upon the tubular member adjacent the free end thereof.

5. A transmission comprising:
   A. a housing;
   B. a driving gear;
   C. means supporting the driving gear for rotation in the housing;
   D. a driven gear in meshing engagement with the driving gear;
   E. means supporting the driven gear for rotation in the housing;
   F. flexible support means operative to yieldably resist omnidirectional radial excursions of the driving gear; and
   G. biasing means imposing a force on the driving gear supplemental to the resisting force exerted by the flexible support means and acting in a direction parallel to the line of action of the meshing gears and opposite to the direction of the force exerted by the driven gear on the driving gear.

6. A transmission according to claim 5 wherein the force exerted by the biasing means is generally equivalent to one half of the maximum force exertable by the driven gear on the driving gear.

7. A transmission according to claim 5 wherein:
   C. the flexible support means has a relatively high spring rate; and
   D. the biasing means has a relatively low spring rate.

8. A transmission according to claim 5 wherein:
   H. the flexible support means comprises a generally tubular shaped member having a fixed end secured to the housing, a free end supporting the driving gear support means, and a central portion interconnecting the ends and including a plurality of circumferentially spaced resiliently deformable ribs; and
   I. the biasing means includes a preloaded resilient member supported by the housing and acting upon the tubular member adjacent the free end thereof.

9. A transmission according to claim 5 wherein the force imparted by the biasing means acts in a direction passing substantially through the axis of rotation of the driving gear.

10. An engine comprising:
    A. a housing;
    B. a bladed rotor having an axis of rotation;
    C. a power takeoff shaft connected at one end to the bladed rotor and having an axis of rotation coaxial with the axis of rotation of the bladed rotor;
    D. a driving gear located on the power takeoff shaft and rotatable therewith;
    E. a bearing journalling the power takeoff shaft;
    F. a driven gear in meshing engagement with the driving gear and mounted for rotation in the housing;
    G. flexible support means
       1. carrying the bearing,
       2. secured to the housing, and 3. operative to yieldably resist omnidirectional radial excursions of the power takeoff shaft from its axis of rotation;
H. biasing means imposing a force on the driving gear supplemental to the resisting force exerted by the flexible support means and acting in a direction parallel to the line of action of the meshing gears and opposite to the direction of the force exerted by the driven gear on the driving gear.

11. An engine according to claim 10 wherein:
I. the flexible support means comprises a generally tubular shaped member having a fixed end secured to the housing, a free end supporting the bearing, and a central portion interconnecting the ends and including a plurality of circumferentially spaced resiliently deformable ribs; and
J. the biasing means includes a preloaded resilient member supported by the housing and acting upon the tubular member adjacent the free end thereof.

12. An engine according to claim 10 wherein the force imparted by the biasing means acts in a direction passing substantially through the axis of rotation of the driving gear.

13. An engine according to claim 10 wherein the force exerted by the biasing means is generally equivalent to one half of the maximum force exertable by the driven gear on the driving gear.

14. An engine according to claim 10 wherein:
I. the flexible support means has a relatively high spring rate; and
J. the biasing means has a relatively low spring rate.

* * * * *